United States Patent
Wake et al.

(10) Patent No.: US 8,258,740 B2
(45) Date of Patent: Sep. 4, 2012

(54) FUEL CELL SYSTEM AND METHOD OF STARTING OPERATION OF FUEL CELL SYSTEM

(75) Inventors: Chihiro Wake, Utsunomiya (JP); Jumpei Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 995 days.

(21) Appl. No.: 12/207,078

(22) Filed: Sep. 9, 2008

(65) Prior Publication Data
US 2009/0068520 A1 Mar. 12, 2009

(30) Foreign Application Priority Data
Sep. 10, 2007 (JP) ................. 2007-233956

(51) Int. Cl.
*H01M 10/44* (2006.01)
(52) U.S. Cl. ...................................... 320/101
(58) Field of Classification Search .......... 429/13; 320/101
See application file for complete search history.

(56) References Cited

U.S. PATENT DOCUMENTS
7,816,884 B2 * 10/2010 Wake et al. ............ 320/101

FOREIGN PATENT DOCUMENTS
| GB | 2281642 | 3/1995 |
|----|---------|--------|
| JP | 7-153474 | 6/1995 |
| JP | 11-176454 | 7/1999 |
| JP | 2004-146118 | 5/2004 |
| JP | 2004-253220 | 9/2004 |
| JP | 2004-281219 | 10/2004 |

OTHER PUBLICATIONS

Japanese Office Action for Application No. 2007-233956, dated Jan. 5, 2010.

* cited by examiner

*Primary Examiner* — Bobby Ramdhanie
(74) *Attorney, Agent, or Firm* — Nelson Mullins Riley & Scarborough LLP; Anthony A. Laurentano (57) ABSTRACT

A fuel cell system and method comprising a fuel cell stack formed by stacking fuel cells, a high voltage energy storage capable of being directly coupled to the fuel cell stack, a DC-DC converter connected to the fuel cell stack and the energy storage, a load operated by consuming at least electrical energy generated by the fuel cell stack or electrical energy discharged from the energy storage, a fuel cell warming up control unit for warming up the fuel cell stack, and a voltage adjustment unit for implementing voltage control to control the output voltage of the fuel cell stack to become equal to, or higher than the terminal voltage of the energy storage, at the time of warming up the fuel cell stack.

10 Claims, 10 Drawing Sheets

I-V CHARACTERISTICS OF FUEL CELL

FUEL CELL SYSTEM AND METHOD OF STARTING OPERATION OF FUEL CELL SYSTEM

BACKGROUND OF THE INVENTION

1. Field of the Invention

The present invention relates to a fuel cell system including a fuel cell, an energy storage, a DC-DC converter, a load operated by consuming at least electrical energy generated by the fuel cell or electrical energy discharged from the energy storage, and a fuel cell warming up control unit for warming up the fuel cell during power generation of the fuel cell. Further, the present invention relates to a method of starting operation of the fuel cell system.

2. Description of the Related Art

The fuel cell is a system for obtaining direct current electrical energy by electrochemical reactions of a fuel gas (chiefly hydrogen-containing gas) supplied to an anode and an oxygen-containing gas supplied to a cathode.

For example, a solid polymer electrolyte fuel cell includes a power generation cell formed by sandwiching a membrane electrode assembly between separators. The membrane electrode assembly includes the anode, and the cathode, and an electrolyte membrane interposed between the anode and the cathode. The electrolyte membrane is a solid polymer ion exchange membrane. In use of this type of the power generation cell, generally, predetermined numbers of the membrane electrode assemblies and separators are alternately stacked together to form a fuel cell stack.

The fuel cell is promising in vehicle applications. For example, the fuel cell is mounted in a vehicle or the like. In the vehicle applications, power generation efficiency is high, and the exhaust gas is clean advantageously.

In the fuel cell vehicle, a hybrid power supply system has been adopted. In the hybrid power supply system, in order to assist the output responsiveness or the like of the fuel cell, an energy storage such as a battery or a capacitor (electric double layer capacitor) is used in combination with the fuel cell. In this case, at the time of starting operation of the system, if the fuel cell is operated at a low temperature, power generation of the fuel cell may not be performed efficiently.

In this regard, for example, a fuel cell system disclosed in Japanese Laid-Open Patent Publication No. 2004-281219 includes a fuel cell for performing power generation using a fuel gas and an oxygen-containing gas supplied to the fuel cell, oxygen-containing gas supplying means for supplying the oxygen-containing gas to the fuel cell, fuel gas supplying means for supplying the fuel gas to the fuel cell, a secondary battery for storing and discharging electrical energy, electrical energy distribution means for supplying electrical energy generated by the fuel cell to auxiliary devices required for power generation of the fuel cell to consume the electrical energy by the auxiliary devices, supplying the electrical energy to the secondary battery for charging the secondary battery, and discharging the secondary battery to supply the discharged electrical energy to the auxiliary devices. Further, the fuel cell system includes control means for warming up the fuel cell and the secondary battery by repeating the step of controlling the electrical energy distribution means to supply electrical energy generated by the fuel cell to the auxiliary devices and the secondary battery at the time of starting operation of the system, and the step of controlling the electrical power distribution means to supply the electrical energy generated by the fuel cell and the electrical energy discharged from the secondary battery to the auxiliary devices.

According to the disclosure, at the time of starting operation of the system, it is possible to stabilize the fuel cell and raise the temperature of the fuel cell by self-heating. Also, it is possible to repeat charging and discharging of the secondary battery and raise the temperature of the secondary battery by self-power generation. Therefore, the fuel cell and the secondary battery are effectively warmed up in a short period of time.

In general, in the system, in a state where the output voltage of the fuel cell is equal to the terminal voltage of the battery (the fuel cell is directly coupled to the battery), it is no longer possible to further decrease the output voltage of the fuel cell from this state. Therefore, it is not possible to collect electrical current from the fuel cell.

The energy storage such as a battery or a capacitor has characteristics in which as increase in the amount of charged electrical energy, the terminal voltage of the energy storage becomes high. In the fuel cell, the current-voltage characteristics (I-V characteristics) change depending on the temperature. In particular, at the time of starting operation of the fuel cell at a temperature below the freezing point, the I-V characteristics are significantly poor.

Figure 10:
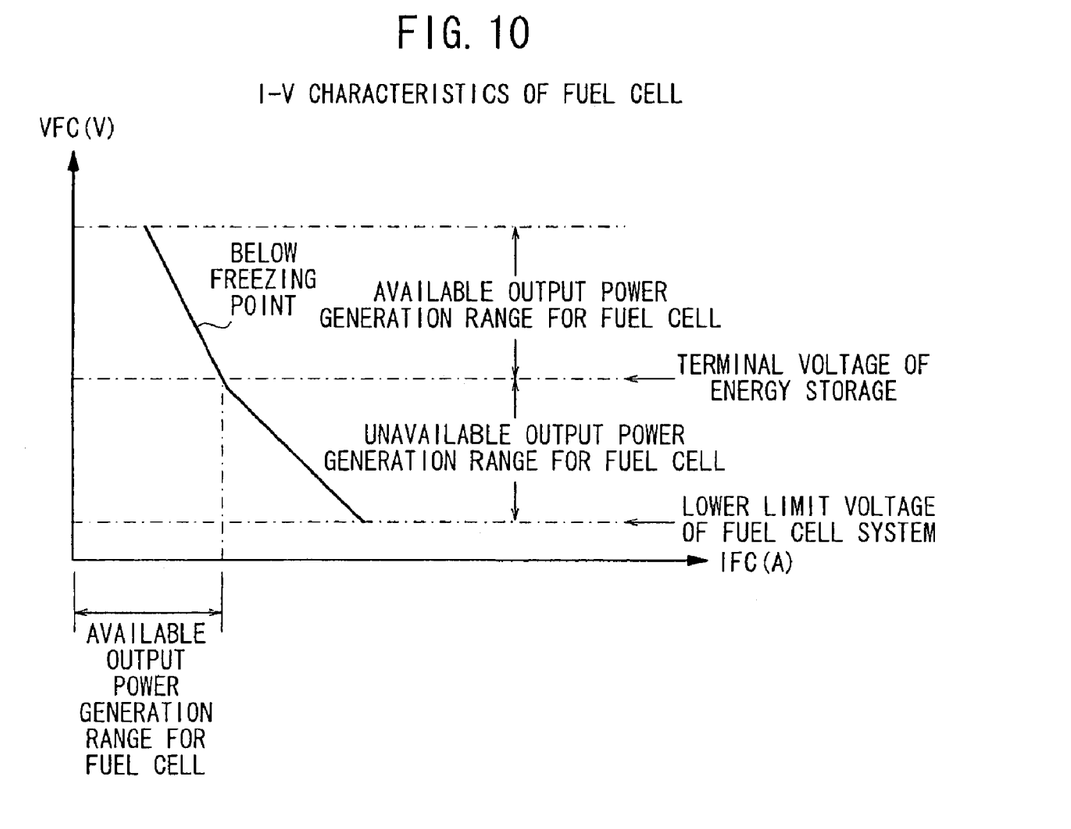
FIG. 10 is a graph showing I-V characteristics of a typical fuel cell.

Thus, as shown in FIG. 10, at the time of starting operation of the fuel cell at a temperature below the freezing point, the available output power generation range is very small. After collecting only a small amount of electrical current from the fuel cell, the potential of the output voltage of the fuel cell becomes equal to the potential of the terminal voltage of the energy storage. Thus, only small current can be collected from the fuel cell. Self-heating of the fuel cell is not performed sufficiently, and continuous power generation cannot be performed suitably.

SUMMARY OF THE INVENTION

The present invention has been made to solve the above problems, and an object of the present invention is to provide a fuel cell system and a method of starting operation of the fuel cell system in which, at the time of starting operation of the fuel cell system at low temperature, self-heating of the fuel cell is achieved reliably, and warming up is facilitated to achieve improvement of the power generation performance rapidly.

The present invention relates to a fuel cell system including a fuel cell for performing power generation by electrochemical reactions of reactant gases supplied to the fuel cell, an energy storage capable of storing and discharging electrical energy generated by power generation of the fuel cell, and capable of being directly coupled to the fuel cell, a DC-DC converter connected to the fuel cell and the energy storage, a load connected to the DC-DC converter, and operated by consuming at least electrical energy generated by the fuel cell or electrical energy discharged from the energy storage, and a fuel cell warming up control unit for warming up the fuel cell during power generation of the fuel cell. Further, the present invention relates to a method of starting operation of the fuel cell system.

The fuel cell system includes a voltage adjustment unit for implementing voltage control to control the output voltage of the fuel cell applied to the load to become equal to, or higher than the terminal voltage of the energy storage, at the time of warming up the fuel cell by the fuel cell warming up control unit.

According to an aspect of the present invention, the method of starting operation of the fuel cell system includes the steps of determining whether the fuel cell is directly coupled to the energy storage at the time of warming up the fuel cell by the fuel cell warming up control unit, and if it is determined that the fuel cell is directly coupled to the energy storage, implementing voltage control to control the output voltage of the fuel cell applied to the load to become equal to, or higher than the terminal voltage of the energy storage.

According to another aspect of the present invention, the method of starting operation of the fuel cell system includes the steps of presuming whether the fuel cell is directly coupled to the energy storage at the time of warming up the fuel cell by the fuel cell warming up control unit, and if it is presumed that the fuel cell is directly coupled to the energy storage, implementing voltage control to control the output voltage of the fuel cell applied to the load to become equal to, or higher than the terminal voltage of the energy storage.

In the present invention, at the time of warming up the fuel cell, since the voltage control is implemented to control the output voltage of the fuel cell supplied to the load to become equal to, or higher than the terminal voltage of the energy storage, at the time of starting operation of the fuel cell system at low temperature, self-heating of the fuel cell is achieved easily and reliably, and warming up is facilitated to achieve improvement of the power generation performance rapidly. Therefore, it is possible to carry out continuous power generation reliably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
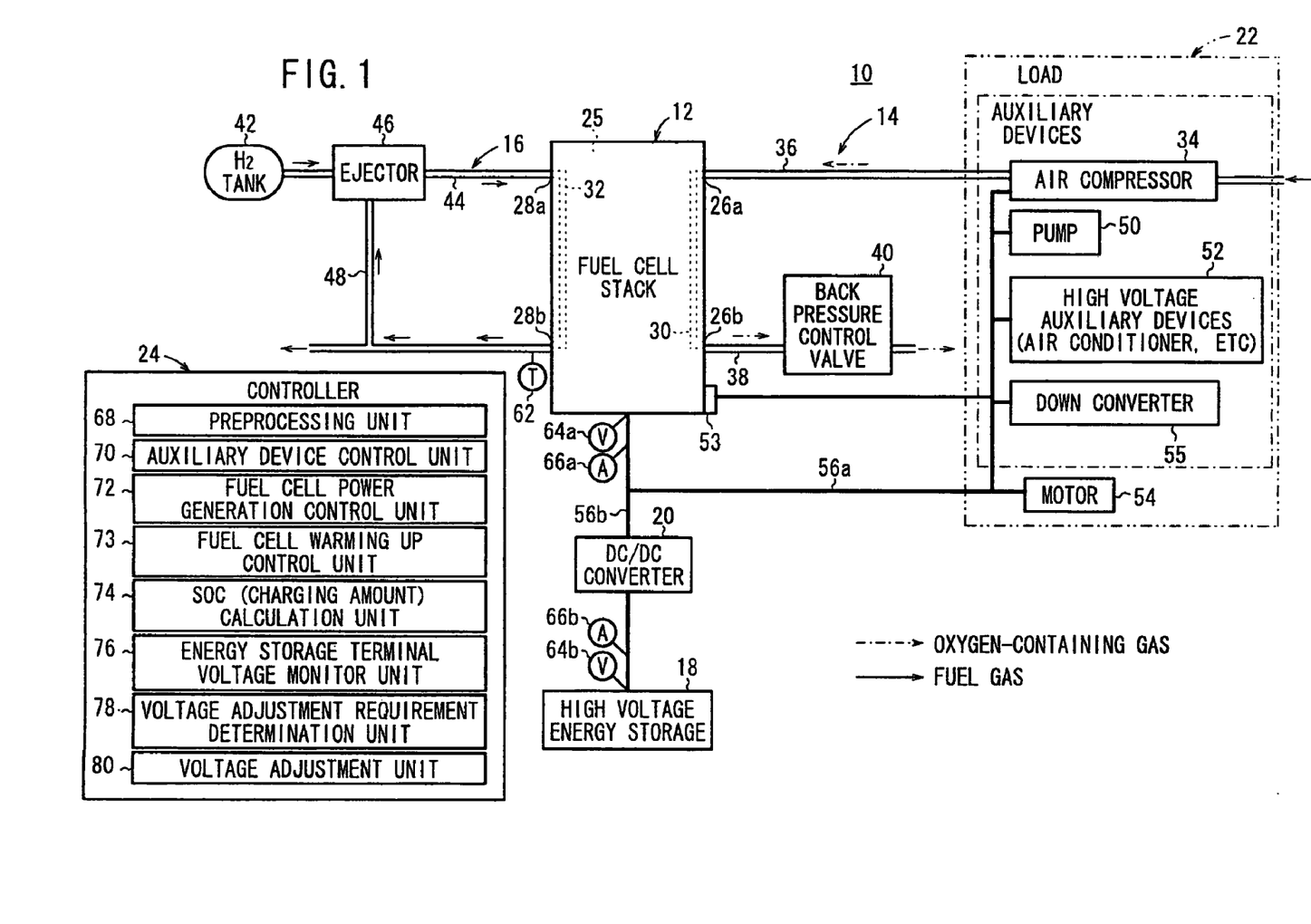
FIG. 1 is a diagram schematically showing structure of a fuel cell system mounted in a vehicle according to a first embodiment of the present invention.

FIG. 1 is a diagram schematically showing structure of a fuel cell system 10 mounted in a vehicle according to a first embodiment of the present invention.

The fuel cell system 10 includes a fuel cell stack 12, an oxygen-containing gas supply apparatus 14 for supplying an oxygen-containing gas to the fuel cell stack 12, a fuel gas supply apparatus 16 for supplying a fuel gas to the fuel cell stack 12, a coolant supply apparatus (not shown) for supplying a coolant to the fuel cell stack 12, and an energy storage, e.g., a high voltage energy storage 18 which is capable of being directly coupled to the fuel cell stack 12 for charging electrical energy generated by the fuel cell stack 12, and discharging the electrical energy. Further, the fuel cell system 10 includes a DC-DC converter 20 capable of implementing up/down conversion of the electrical energy discharged from the high voltage energy storage 18 and connected to the fuel cell stack 12 and to the high voltage energy storage 18, loads 22 which are operated at least using the electrical energy generated by the fuel cell stack 12 or the electrical energy discharged from the high voltage energy storage 18, and a control device (controller) 24 for implementing the overall control of the fuel cell system 10.

The fuel cell stack 12 is formed by stacking a plurality of fuel cells 25. Though not shown, each of the fuel cells 25 includes a membrane electrode assembly including an anode, a cathode, and a solid polymer electrolyte membrane interposed between the anode and the cathode. The membrane electrode assembly is sandwiched between a pair of separators.

At one end of the fuel cell stack 12 in the stacking direction, an oxygen-containing gas supply passage 26a for supplying an oxygen-containing gas such as the air and an oxygen-containing gas discharge passage 26b for discharging the fuel gas are formed. At the other end of the fuel cell stack 12 in the stacking direction, a fuel gas supply passage 28a for supplying the fuel gas such as a hydrogen-containing gas and a fuel gas discharge passage 28b for discharging the fuel gas are formed.

The oxygen-containing gas supply passage 26a and the oxygen-containing gas discharge passage 26b are connected to an oxygen-containing gas flow field 30 formed between the membrane electrode assembly of each fuel cell 25 and one of the separators sandwiching the membrane electrode assembly. The fuel gas supply passage 28a and the fuel gas discharge passage 28b are connected to a fuel gas flow field 32 formed between the membrane electrode assembly of each fuel cell 25 and the other of the separators sandwiching the membrane electrode assembly.

The oxygen-containing gas supply apparatus 14 includes an air compressor 34 for compressing the atmospheric air from the outside, and supplying the compressed air to the fuel cell stack 12. The air compressor 34 is provided in an air supply channel 36. The air supply channel 36 is connected to the oxygen-containing gas supply passage 26a of the fuel cell stack 12.

The oxygen-containing gas supply apparatus 14 includes an air discharge channel 38 which is connected to the oxygen-containing gas discharge passage 26b. A back pressure control valve 40 is provided in the air discharge channel 38 for regulating the pressure of the air supplied from the air compressor 34 to the fuel cell stack 12 through the air supply channel 36.

The fuel gas supply apparatus 16 includes a hydrogen tank 42 for storing a high pressure hydrogen (hydrogen-containing gas). The hydrogen tank 42 is connected to the fuel gas supply passage 28a of the fuel cell stack 12 through a hydrogen supply channel 44. An ejector 46 is provided in the hydrogen supply channel 44. The hydrogen gas is supplied from the hydrogen tank 42 to the ejector 46. The ejector 46 supplies the hydrogen gas to the fuel cell stack 12 through the hydrogen supply channel 44. Further, the ejector 46 sucks the exhaust gas containing the unconsumed hydrogen gas which has not been consumed in the fuel cell stack 12 such that the exhaust gas is discharged to a hydrogen circulation channel 48 connected to the fuel gas discharge passage 28b. The exhaust gas sucked by the ejector 46 is supplied again to the fuel cell stack 12.

The loads 22 include, in addition to the air compressor 34, a pump 50 of the coolant supply apparatus, high voltage auxiliary devices 52 including an air conditioner, a heater 53 for heating the fuel cell stack 12, and a motor 54 for traveling and low voltage auxiliary devices (not shown) such as audio devices and lights connected through a down converter 55.

The fuel cell stack 12 and the loads 22 are connected through a first bus 56a. A second bus 56b is branched from the first bus 56a, and the high voltage energy storage 18 is connected to the second bus 56b through the DC-DC converter 20. That is, the loads 22 are connected between the fuel cell stack 12 and the DC-DC converter 20. For example, a capacitor such as an electric double layer capacitor or a battery is used as the high voltage energy storage 18.

In a hydrogen circulation channel 48 of the fuel gas supply apparatus 16, a temperature sensor 62 is provided near the fuel gas discharge passage 28b. Further, a first voltage sensor 64a and a first current sensor 66a are provided in the first bus 56a near the fuel cell stack 12. A second current sensor 66b and a second voltage sensor 64b are provided in the second bus 56b near the high voltage energy storage 18.

The control device 24 has functions of a pre-processing unit 68, an auxiliary device control unit 70, a fuel cell power generation control unit 72, a fuel cell warming up control unit 73, an SOC calculation unit 74, an energy storage terminal voltage monitor unit 76, a voltage adjustment requirement determination unit 78, and a voltage adjustment unit 80. The pre-processing unit 68 carries out preparatory operation before power generation of the fuel cell stack 12. The auxiliary device control unit 70 is capable of decreasing the amount of remaining energy in the high voltage energy storage 18 to a predetermined value (described later) by any of the loads 22 before power generation of the fuel cell stack 12. The fuel cell power generation control unit 72 implements power generation control of the fuel cell stack 12. The fuel cell warming up control unit 73 performs warming up operation of the fuel cell stack 12 during power generation of the fuel cell stack 12. The SOC calculation unit 74 calculates the state of charge (SOC) in the high voltage energy storage 18. The energy storage terminal voltage monitor unit 76 monitors the terminal voltage of the high voltage energy storage 18. The voltage adjustment requirement determination unit 78 determines (or presumes) whether voltage adjustment between the power generation voltage (output voltage) of the fuel cell stack 12 and the terminal voltage of the high voltage energy storage 18 is required or not. The voltage adjustment unit 80 adjusts the power generation voltage of the fuel cell stack 12 or the terminal voltage of the high voltage energy storage 18.

Figure 2:
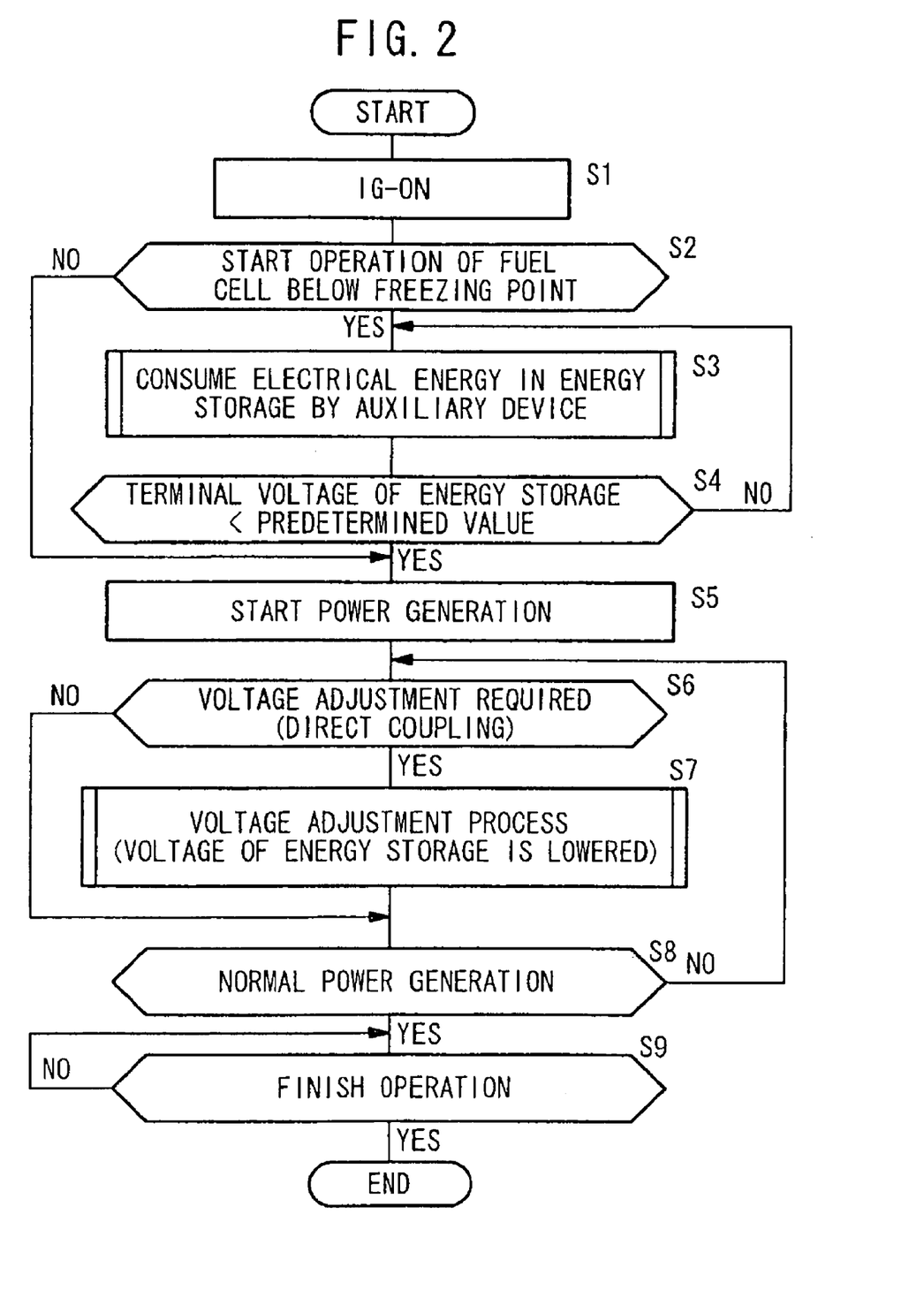
FIG. 2 is a flow chart showing a method of starting operation according to the first embodiment of the present invention.

Operation of the fuel cell system 10 will be described in connection with a method of staring operation of the fuel cell system 10 according to the first embodiment of the present invention with reference to a flow chart shown in FIG. 2.

Firstly, when an ignition (not shown) of the fuel cell system 10 is turned on, (step S1), the process proceeds to step S2, and it is determined whether operation of the fuel cell stack 12 is started at a temperature below the freezing point or not.

Figure 3:
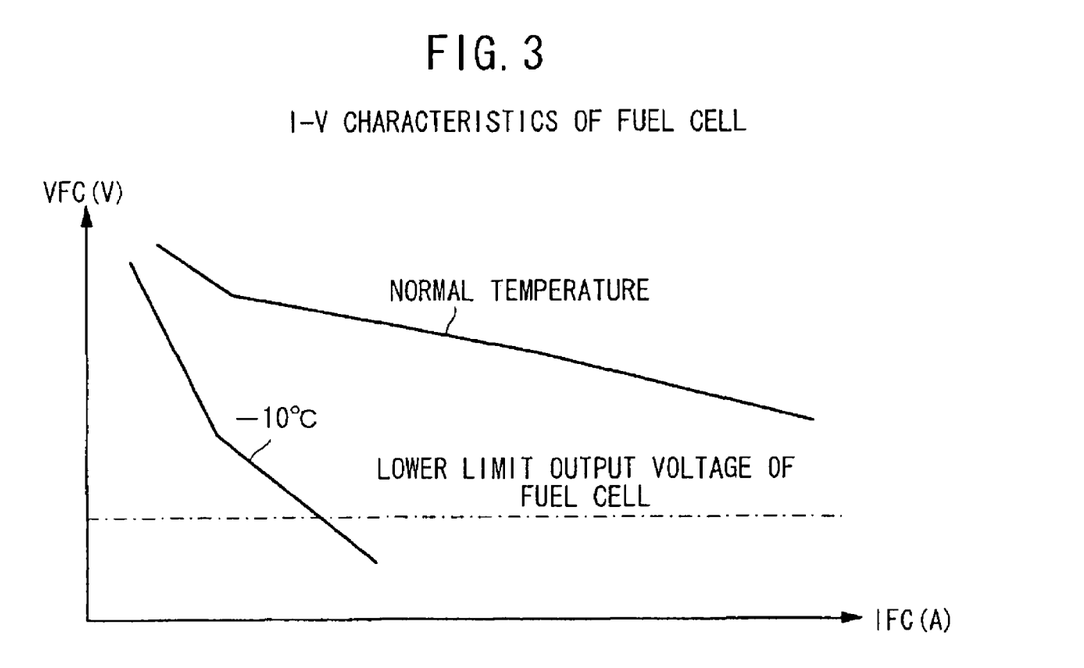
FIG. 3 is a graph showing I-V characteristics of a fuel cell depending on the change in the temperature.

As shown in FIG. 3, in comparison with the normal temperature, the I-V characteristics (current-voltage characteristic) of the fuel cell 25 are significantly poor at low temperature, in particular, below the freezing point. Thus, in step S2, if it is determined that operation of the fuel cell stack 12 is started at a temperature below the freezing point (YES in step S2), i.e., if it is determined that operation of the fuel cell stack 12 will not be brought into a steady state, the process proceeds to step S3 to consume electrical energy in the high voltage energy storage 18 by the auxiliary devices.

Specifically, the auxiliary device control unit 70 supplies electrical current from the high voltage energy storage 18 to the auxiliary devices such as the air compressor 34 and the pump 50 for operation of the fuel cell stack 12. Therefore, the rotation number of the air compressor 34 is increased. The air is increased under higher pressure, and energy consumption in the high voltage energy storage 18 is performed.

Further, electric current from the high voltage energy storage 18 is supplied to the external loads of the high voltage auxiliary devices 52 separately from operation of the fuel cell stack 12, such as an air conditioner heater or a fan to consume electrical energy in the high voltage energy storage 18. Further, by supplying electrical current to the heater 53, electrical energy in the high voltage energy storage 18 is consumed, and it is possible to warm up the fuel cell stack 12.

Figure 4:
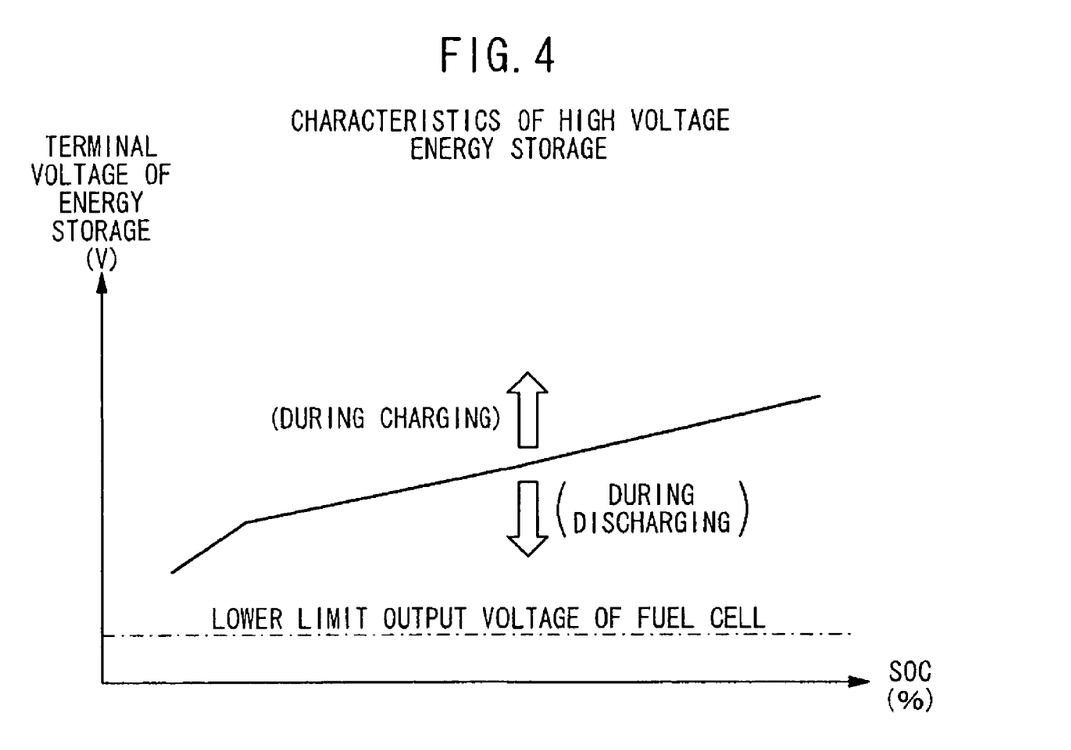
FIG. 4 is a graph showing characteristics of a high voltage energy storage.
Figure 5:
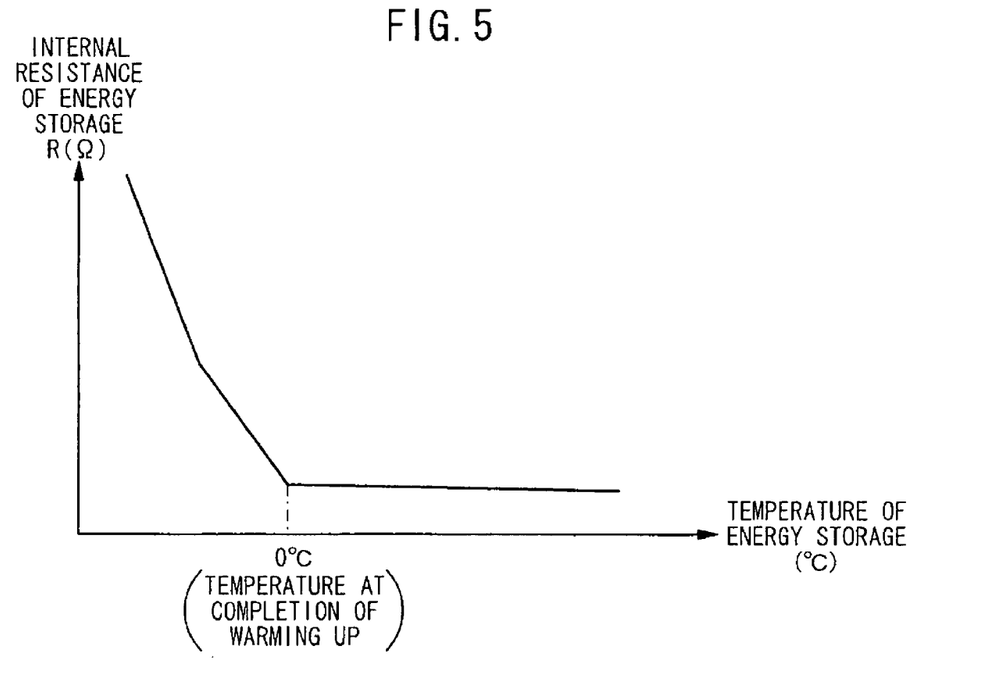
FIG. 5 is a graph showing the relationship between the internal resistance and the temperature of the high voltage energy storage.

In this case, as shown in FIG. 4, the terminal voltage of the high voltage energy storage 18 changes depending on the state of charge (SOC). As the decrease in the amount of electrical energy in the high voltage energy storage 18, the terminal voltage of the high voltage energy storage 18 is decreased. Further, as shown in FIG. 5, as the decrease in the temperature, the internal resistance of the high voltage energy storage 18 is increased. Specifically, the internal resistance of the high voltage energy storage 18 becomes significantly high at the temperature below 0° C. Therefore, if electrical energy is charged in the high voltage energy storage 18 in an atmosphere below the freezing point, the terminal voltage of the high voltage energy storage 18 is temporarily increased to a significantly large value. Thus, in step S3, when electrical energy in the high voltage energy storage 18 is consumed by the auxiliary devices, the terminal voltage of the high voltage energy storage 18 is decreased.

As long as the electrical energy in the high voltage energy storage 18 is consumed by the auxiliary devices substantially before starting of the power operation of the fuel cell stack 12, the energy consumption may be performed before or after the supplying the fuel gas to the fuel cell stack 12, or may be performed before checking OCV (open circuit voltage).

The SOC calculation unit 74 calculates the amount of electrical energy (charging amount) remaining in the high voltage energy storage 18 through the second current sensor 66b and the second voltage sensor 64b. In step S4, an energy storage terminal voltage monitor unit 76 determines whether the terminal voltage of the high voltage energy storage 18 detected by the second voltage sensor 64b becomes a predetermined value or less.

The predetermined value is close to the lower limit voltage outputted from the fuel cell stack 12 in the atmosphere at the temperature at which the electrical energy in the high voltage energy storage 18 is consumed as described above. If it is determined that the detected terminal voltage of the high voltage energy storage 18 is the predetermined voltage or less (YES in step S4), the process proceeds to step S5 to start power generation of the fuel cell stack 12.

As shown in FIG. 1, in the oxygen-containing gas supply apparatus 14, the air compressor 34 is driven. The compressed air supplied from the air compressor 34 is supplied to the oxygen-containing gas supply passage 26a of the fuel cell stack 12 through the air supply channel 36. In the fuel gas supply apparatus 16, the hydrogen gas supplied from the hydrogen tank 42 is supplied to the fuel gas supply passage 28a of the fuel cell stack 12 through the ejector 46 and the hydrogen supply channel 44.

In each of the fuel cells 25 of the fuel cell stack 12, the air (oxygen-containing gas) supplied to the oxygen-containing gas supply passage 26a flows into the oxygen-containing gas flow field 30, and moves along the electrode surface of the cathode (not shown) for inducing an electrochemical reaction at the cathode. Then, the air is discharged into the oxygen-containing gas discharge passage 26b.

The hydrogen gas (fuel gas) supplied to the fuel gas supply passage 28a moves along the electrode surface of the anode (not shown) of each fuel cell 25 for inducing an electrochemical reaction at the anode, and thereafter the hydrogen gas is discharged into the fuel gas discharge passage 28b. Thus, in each of the fuel cells 25, by the electrochemical reactions of the oxygen in the air supplied to the cathode and the hydrogen supplied to the anode, power generation is performed.

The fuel gas discharge passage 28b of the fuel cell stack 12 is connected to the hydrogen circulation channel 48. Thus, the exhaust gas (exhaust fuel gas containing unconsumed hydrogen) discharged to the hydrogen circulation channel 48 returns to a position in the middle of the hydrogen supply channel 44 by sucking operation of the ejector 46, and then, the exhaust gas is supplied to the fuel cell stack 12 again as the fuel gas.

As described above, power generation is performed in each of the fuel cells 25, and the fuel cell stack 12 is warmed up by self-heating. Further, the fuel cell warming up control unit 73 supplies electric current to the heater 53 as necessary. The fuel cell stack 12 is warmed up by the self-heating of the fuel cells 25 and heating by the heater 53.

While warming up the fuel cell stack 12, in step S6, it is determined whether voltage adjustment is required or not. In the first embodiment, the determination in step S6 is made based on whether or not the output voltage of the fuel cell stack 12 is equal to the terminal voltage of the high voltage energy storage 18, i.e., based on whether or not the system is in the direct coupling state. Then, if it is determined that voltage adjustment is required (YES in step S6), the process proceeds to step S7 to perform the voltage adjustment process by the voltage adjustment unit 80.

The voltage adjustment process is a voltage control for controlling voltages such that the terminal voltage of the high voltage energy storage 18 becomes lower than the output voltage of the fuel cell stack 12. In the first embodiment, this voltage control is implemented by lowering the voltage of the DC-DC converter 20 on the high voltage energy storage 18 side.

Then, in step S8, it is determined whether normal power operation of the fuel cell system 10 is performed or not. During the normal operation, electrical energy generated by power generation is supplied from the fuel cell stack 12 to the motor 54 through the first bus 56a for operation by the fuel cell system 10 (YES in step S8). Thereafter, it is determined that the operation is finished by turning off the ignition (YES in step S9), the power generation process in the fuel cell system 10 is finished.

Figure 6:
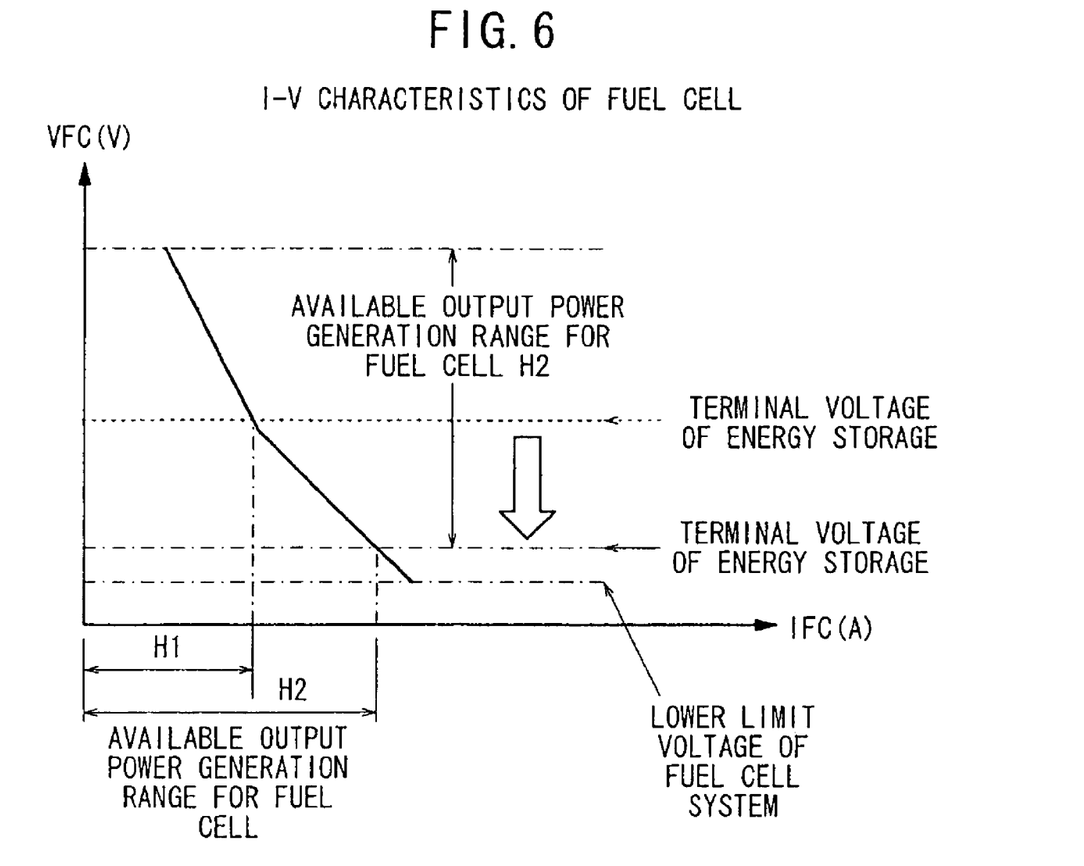
FIG. 6 is a graph showing I-V characteristics of a fuel cell when the terminal voltage of the high voltage energy storage is lowered (stepped down)

In the first embodiment, at the time of warming up the fuel cell stack 12, voltage control is implemented such that the output voltage of the fuel cell stack 12 applied to the loads such as the motor 54 becomes equal to or higher than the terminal voltage of the high voltage energy storage 18. Specifically, the voltage of the DC-DC-converter 20 on the high voltage energy storage 18 side is lowered (stepped down). Thus, as shown in FIG. 6, the terminal voltage of the high voltage energy storage 18 is decreased to a value close to the lower limit voltage of the fuel cell system 10, and the range H1 of available power generation output of the fuel cell stack 12 is expanded to the range H2 of the available power generation output.

Thus, the range of direct coupling between the fuel cell stack 12 and the high voltage energy storage 18 is sufficiently expanded, and it is possible to effectively increase the electrical current collected from the fuel cell stack 12. Accordingly, in particular, at the time of starting operation of the fuel cell stack 12 at low temperature, it is possible to reliably and easily induce self-heating of the fuel cell stack 12. The fuel cell stack 12 is warmed up suitably, improvement in the power generation performance is achieved rapidly, and it becomes possible to carry out continuous power generation reliably.

In the first embodiment, at the time of warming up the fuel cell stack 12, if it is determined that the fuel cell stack 12 is directly coupled to the high voltage energy storage 18, the voltage of the DC-DC converter 20 on the high voltage energy storage 18 side is lowered (stepped down). However, the present invention is not limited in this respect.

For example, by not charging electrical energy in the high voltage energy storage 18, a process of preventing the increase in the terminal voltage of the high voltage energy storage 18 can be performed. Accordingly, it becomes possible to prevent the terminal voltage of the high voltage energy storage 18 from temporarily and sharply rising due to charging and to reliably maintain the terminal voltage of the high voltage energy storage 18 at the output voltage of the fuel cell stack 12 or less.

Further, by discharging electrical energy from the high voltage energy storage 18 to collect the electrical current discharged from the high voltage energy storage 18, a process of lowering the terminal voltage can be performed. Accordingly, temporal and sharp decrease in the terminal voltage of the high voltage energy storage 18 is carried out by discharging of the electrical energy. Thus, it becomes possible to reliably maintain the terminal voltage of the high voltage energy storage 18 at the output voltage of the fuel cell stack 12 or less.

Figure 7:
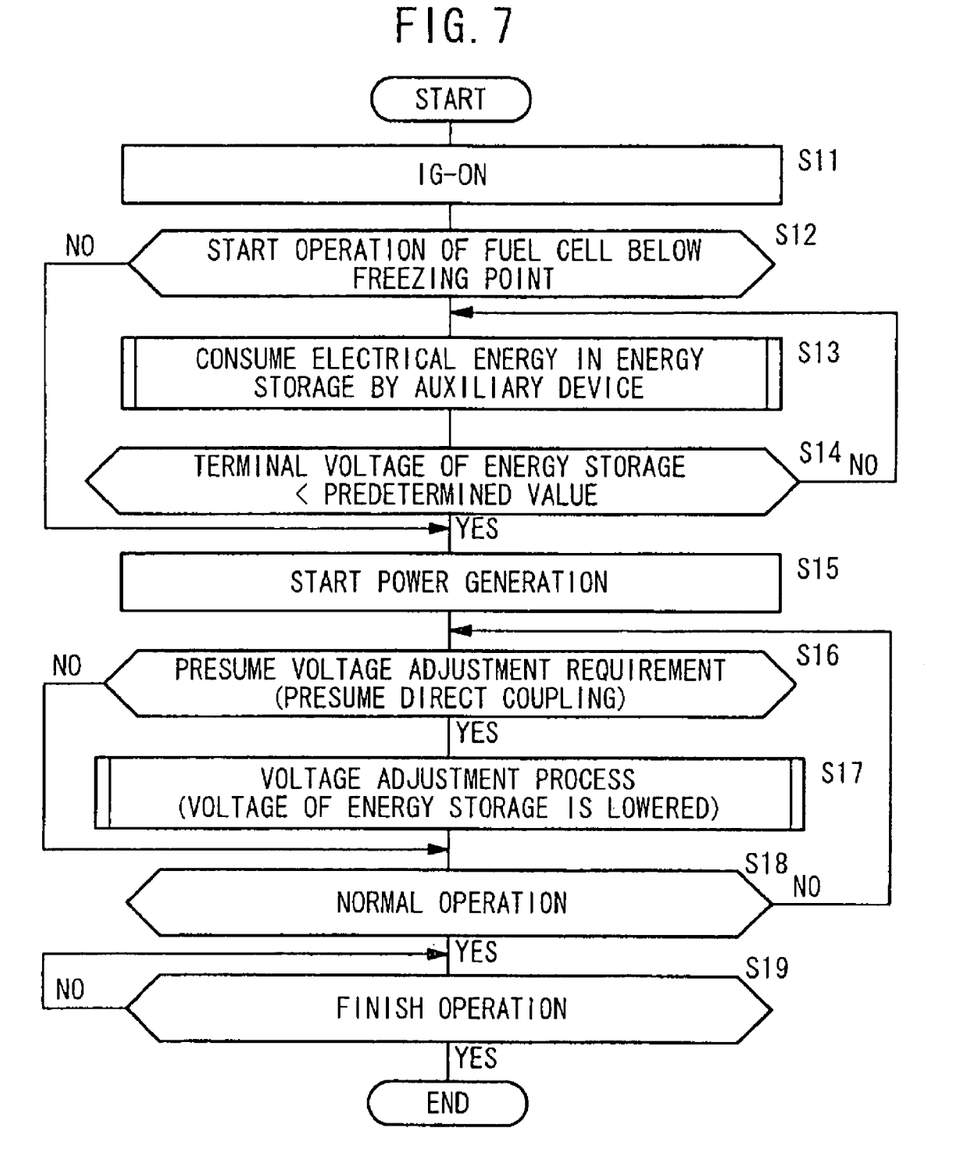
FIG. 7 is a flow chart showing a method of starting operation according to a second embodiment of the present invention.

Next, a method of starting operation according to a second embodiment of the present invention will be described with reference to a flow chart in FIG. 7. Description regarding the steps that are identical to those in the method of starting operation according to the first embodiment is omitted.

In the second embodiment, firstly, after the ignition is turned on, processes before power generation of the fuel cell stack 12 is started (steps S11 to steps S15) are performed in the same manner as the steps S1 to S5 of the first embodiment.

Further, after power generation of the fuel cell stack 12 is started, during warming up of the fuel cell stack 12, the voltage adjustment requirement determination unit 78 presumes whether the fuel cell stack 12 is directly coupled to the high voltage energy storage 18 (step S16). Specifically, it is determined whether the fuel cell stack 12 is under control for starting operation below the freezing point. If it is determined that the fuel cell stack 12 is under control for starting operation below the freezing point (YES in step S16), the process proceeds to step S17 to perform the voltage adjustment process.

As described above, in the second embodiment, while warming up the fuel cell stack 12, direct coupling between the fuel cell stack 12 and the high voltage energy storage 18 is predicted, and the voltage adjustment is performed beforehand. Therefore, in comparison with the case where the voltage adjustment is performed for the first time when the output voltage of the fuel cell stack 12 becomes equal to the terminal voltage of the high voltage energy storage 18, responsiveness of electrical energy supplied to the auxiliary devices is improved.

In step S16, the presumption of whether the fuel cell stack 12 is directly coupled to the high voltage energy storage 18 is made based on whether the fuel cell stack 12 is under control for starting operation below the freezing point or not. Alternatively, the presumption may be made based on whether the I-V characteristics of the fuel cell stack 12 are low or not. In this case, the presumption should be made by determining whether the I-V characteristics at the time of the last power generation is low in comparison with predetermined I-V characteristics, or whether the I-V characteristics at the time of the current power generation are lower than the predetermined I-V characteristics. Alternatively, the presumption may be made by determining whether the OCV check voltage at the time of starting operation this time is equal to, or lower than a predetermined voltage or not.

Figure 8:
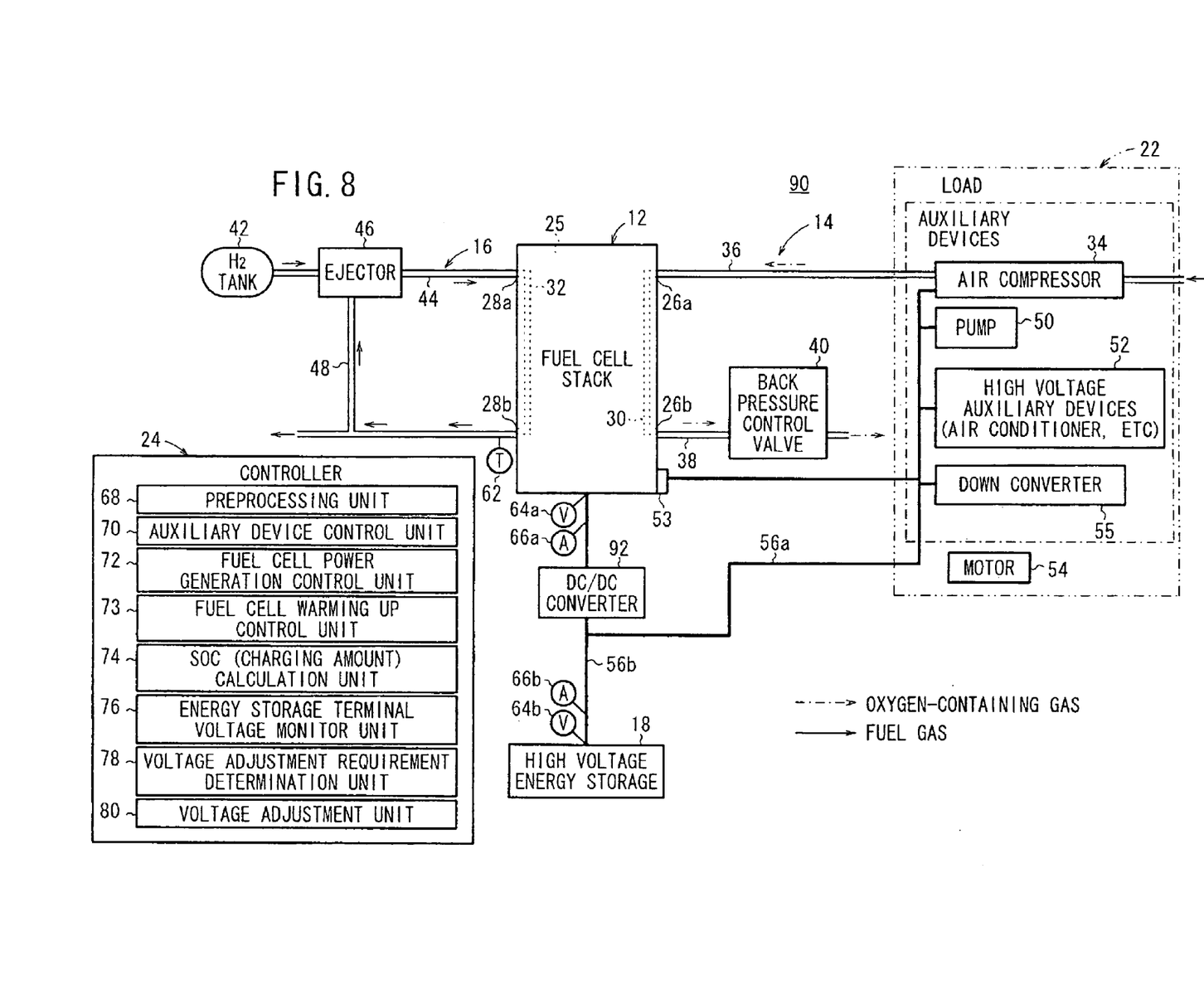
FIG. 8 is a diagram schematically showing structure of a fuel cell system to which a method of starting operation according to a third embodiment of the present invention is applied.

FIG. 8 is a diagram schematically showing a fuel cell system 90 mounted in a vehicle to which a method of starting operation according to a third embodiment of the present invention is applied. The constituent elements that are identical to those of the fuel cell system 10 according to the first embodiment are labeled with the same reference numerals, and description thereof is omitted.

In the fuel cell system 90, a DC-DC converter 92 capable of boosting the voltage is provided in a first bus 56a connecting the fuel cell stack 12 and the loads 22. The high voltage energy storage 18 is provided in a second bus 56b branched from the first bus 56a. That is, the loads 22 are connected between the high voltage energy storage 18 and the DC-DC converter 92.

Figure 9:
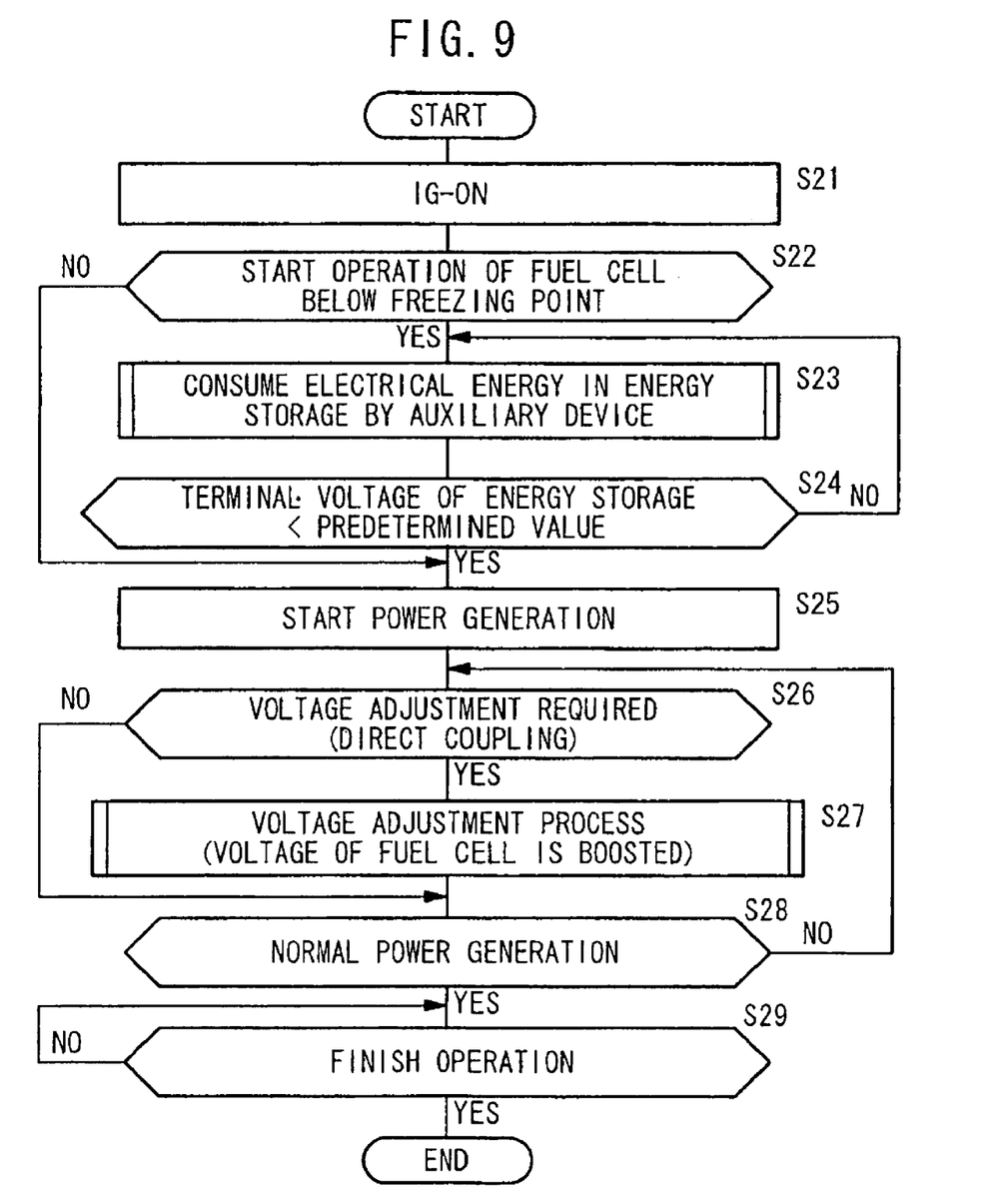
FIG. 9 is a flow chart showing a method of starting operation according to the third embodiment of the present invention.

The method of starting operation according to the third embodiment will be described with reference to a flow chart shown in FIG. 9. Firstly, after the ignition is turned on, processes before power generation of the fuel cell stack 12 is started (steps S21 to steps S25) are performed in the same manner as the steps S1 to S5 of the first embodiment.

After power generation of the fuel cell stack 12 is started, during warming up of the fuel cell stack 12, the voltage adjustment requirement determination unit 78 determines whether the fuel cell stack 12 is directly coupled to the high voltage energy storage 18 (or presume whether the fuel cell stack 12 is directly coupled to the high voltage energy storage 18 as in the case of the second embodiment) (step S26).

If it is determined (or presumed) that the voltage adjustment is required (YES in step S26), the process proceeds to step S27 to perform the voltage adjustment by the voltage adjustment unit 80. The voltage adjustment process is a voltage control for controlling voltages such that the terminal voltage of the high voltage energy storage 18 becomes lower than the output voltage of the fuel cell stack 12. In the third embodiment, this voltage control is implemented by boosting the voltage of the DC-DC converter 92 on the fuel cell stack 12 side.

Thus, in the third embodiment, at the time of warming up the fuel cell stack 12, by boosting the voltage of the DC-DC converter 92 on the fuel cell stack 12 side, the output voltage of the fuel cell stack 12 is controlled to become equal to, or higher than the terminal voltage of the high voltage energy storage 18. Accordingly, it becomes possible to reliably maintain the terminal voltage of the high voltage energy storage 18 at such a voltage as is equal to, or lower than the output voltage of the fuel cell stack 12. Thus, the same advantages as in the cases of the first and second embodiments can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of starting operation of a fuel cell system, the method comprising the steps of:
providing a fuel cell system comprising:
a fuel cell for performing power generation by electrochemical reactions of reactant gases supplied to the fuel cell;
an energy storage capable of storing and discharging electrical energy generated by power generation of the fuel cell, and capable of being directly coupled to the fuel cell;
a DC-DC converter connected to the fuel cell and the energy storage;
a load connected to the DC-DC converter, and operated by consuming at least electrical energy generated by the fuel cell or electrical energy discharged from the energy storage; and
a fuel cell warming up control unit for warming up the fuel cell, during power generation of the fuel cell;
determining whether the fuel cell is directly coupled to the energy storage at the time of warming up the fuel cell by the fuel cell warming up control unit; and
if it is determined that the fuel cell is directly coupled to the energy storage, implementing voltage control to control an output voltage of the fuel cell applied to the load to become equal to, or higher than the terminal voltage of the energy storage.

2. A method of starting operation of the fuel cell system according to claim 1, wherein the voltage control is implemented by inhibiting charging of electrical energy in the energy storage.

3. A method of starting operation of the fuel cell system according to claim 1, wherein the voltage control is implemented by collecting electrical current from the energy storage.

4. A method of starting operation of the fuel cell system according to claim 1, wherein the voltage control is implemented by lowering the terminal voltage of the energy storage.

5. A method of starting operation of the fuel cell system according to claim 1, wherein the voltage control is implemented by boosting the output voltage of the fuel cell.

6. A method of starting operation of a fuel cell system, the method comprising the steps of:
providing a fuel cell system comprising:
a fuel cell for performing power generation by electrochemical reactions of reactant gases supplied to the fuel cell;
an energy storage capable of storing and discharging electrical energy generated by power generation of the fuel cell, and capable of being directly coupled to the fuel cell;
a DC-DC converter connected to the fuel cell and the energy storage;
a load connected to the DC-DC converter, and operated by consuming at least electrical energy generated by the fuel cell or electrical energy discharged from the energy storage; and
a fuel cell warming up control unit for warming up the fuel cell during power generation of the fuel cell;

presuming whether the fuel cell is directly coupled to the energy storage at the time of warming up the fuel cell by the fuel cell warming up control unit; and if it is presumed that the fuel cell is directly coupled to the energy storage, implementing voltage control to control an output voltage of the fuel cell applied to the load to become equal to, or higher than the terminal voltage of the energy storage.

7. A method of starting operation of the fuel cell system according to claim 6, wherein the voltage control is implemented by inhibiting charging of electrical energy in the energy storage.

8. A method of starting operation of the fuel cell system according to claim 6, wherein the voltage control is implemented by collecting electrical current from the energy storage.

9. A method of starting operation of the fuel cell system according to claim 6, wherein the voltage control is implemented by lowering the terminal voltage of the energy storage.

10. A method of starting operation of the fuel cell system according to claim 6, wherein the voltage control is implemented by boosting the output voltage of the fuel cell.

* * * * *